United States Patent
Boehringer et al.

[19]

[11] Patent Number: 6,006,848

[45] Date of Patent: Dec. 28, 1999

[54] SYSTEM FOR CONTROLLING AND/OR REGULATING THE LONGITUDINAL SPEED OF A MOTOR VEHICLE

[75] Inventors: Michael Boehringer, Waiblingen; Lutz Eckstein, Stuttgart, both of Germany

[73] Assignee: DaimlerChrysler Ag, Germany

[21] Appl. No.: 09/012,555

[22] Filed: Jan. 23, 1998

[30] Foreign Application Priority Data

Jan. 23, 1997 [DE] Germany ............ 197 02 312

[51] Int. Cl.⁶ ............ B60H 31/00
[52] U.S. Cl. ............ 180/178; 180/179; 701/93
[58] Field of Search ............ 280/170, 178, 280/179; 123/350, 352; 701/70, 22, 93, 94, 110

[56] References Cited

U.S. PATENT DOCUMENTS

| | | | |
|---|---|---|---|
| 4,591,986 | 5/1986 | Nakajima et al. | 364/426 |
| 4,829,437 | 5/1989 | Suzuki et al. | 364/426.04 |
| 5,508,925 | 4/1996 | Katayama et al. | 364/426.04 |
| 5,541,843 | 7/1996 | Yanaguchi et al. | 180/179 |
| 5,713,428 | 2/1998 | Linden et al. | 180/179 |
| 5,799,262 | 8/1998 | Suzuki | 180/179 |

FOREIGN PATENT DOCUMENTS

| | | |
|---|---|---|
| 27 01 567 C2 | 3/1987 | Germany . |
| 35 10 174 C2 | 2/1996 | Germany . |
| 196 00 140 A1 | 7/1997 | Germany . |
| 62-120237 | 6/1987 | Japan . |
| 4-134141 | 5/1998 | Japan . |
| 37875 | 9/1998 | Japan . |

*Primary Examiner*—Richard M. Camby
*Attorney, Agent, or Firm*—Evenson, McKeown, Edwards & Lenahan, P.L.L.C.

[57] ABSTRACT

A system for controlling or regulating the longitudinal speed of a motor vehicle includes an operating element for defining a desired longitudinal acceleration value as a function of a pertaining operating element actuating quantity. In a first embodiment of the invention, the system sets the longitudinal speed of the vehicle to the desired value adjusted by way of the operating element if the amount of this value is above a definable threshold value. Otherwise it sets a constant longitudinal speed which is lower than the actual vehicle speed at the moment when the set desired longitudinal acceleration value falls below the threshold value, by a differential value defined as a function of the speed. In a second embodiment which is preferably combined with the first embodiment, the adjusting sensitivity of the desired longitudinal acceleration value decreases with increasing longitudinal speed.

5 Claims, 2 Drawing Sheets

SYSTEM FOR CONTROLLING AND/OR REGULATING THE LONGITUDINAL SPEED OF A MOTOR VEHICLE

BACKGROUND AND SUMMARY OF THE INVENTION

This application claims the priority of German patent document 197 02 312.6, the disclosure of which is expressly incorporated by reference herein.

The invention relates to a system for controlling the longitudinal speed of a motor vehicle which contains an operating element that can be actuated to designate a desired longitudinal acceleration value.

In automobiles, the desired longitudinal vehicle speed is conventionally controlled by means of gas and brake pedals. Alternatively, it has been suggested that a control-stick be used as an operating element, at least to initiate positive accelerations, and optionally also to trigger negative accelerations, (that is, deceleration). Thus, for example, in one possible function assignment, actuation of the operating element toward the front can trigger a speed increase and actuation toward the rear can trigger a speed reduction. Arrangements of this type are described in U.S. Pat. No. 3,022,850, and in the publication by H. Bubb "Arbeitsplatz Fahrer—Eine ergonomische Studie" ("Workplace—Driver, An Ergonomic Study", *Automobil-Industrie* 3/85, Pages 265.

A system in which the operating element can be operated manually, and is preferably constructed as a control stick, is described in German patent document DE 196 00 140.4. In this system, a longitudinal speed control is performed by actuating the operating element in the forward direction for positive acceleration, and toward the rear for negative acceleration.

In accordance with a defined linear characteristic curve, actuation of the operating element determines a desired longitudinal acceleration value as a function of the operating element deflection. To maintain a defined speed despite variations in existing road resistance, the acceleration regulator can be activated with the desired longitudinal acceleration value of zero.

German patent document DE 27 01 567 C2 discloses a speed control device for vehicles in which an adjusting member is provided for designating an acceleration or deceleration defined as a function of the driver's desire. The corresponding acceleration or deceleration desire is processed in a desired speed value generator into a corresponding desired speed value, which will then be supplied to a speed control. By means of a function generator within the speed control, the signal of the adjusting member is processed such that four ranges are formed. Specifically, these are an idling range, a deceleration range, a pressure point range and an acceleration range. If the adjusting member is in the pressure point range, which is situated between 30% and 40% of the overall path of the adjusting member, the vehicle speed is controlled to a constant desired value. When the adjusting member position exceeds or falls below the pressure point range, a corresponding acceleration or deceleration signal is generated.

German Patent Document DE 35 10 174 C2 describes a device for influencing the driving speed of a motor vehicle which comprises an operating part, a speed control, an acceleration control and a condition control which transmits an adjusting signal of the speed control or the acceleration control to a fuel quantity metering device, as a function of the actuating condition selected by the driver via the operating part. Acceleration control is implemented before and/or after the speed control.

The speed control has an integral part which, during the transition from acceleration control to speed control, is set by the condition control to an initial value that corresponds to a quantity-characterizing signal of the fuel quantity metering device before the selection of acceleration control. Specifically, at the end of an acceleration phase, the desired speed value for the subsequent speed control is set to the actual speed value at this time, until the overshooting actual speed has assumed a constant value to which the desired speed will then be newly set.

The object of the present invention is to provide a system of the initially mentioned type which permits a comfortable and ergonomic control and/or regulating of the longitudinal speed of a motor vehicle.

This and other objects and advantages are achieved by the control system according to the invention, in which whenever the desired longitudinal acceleration value designated by the operating element is above a set threshold value (which preferably is very low in comparison to the maximum possible vehicle acceleration), the system adjusts the longitudinal vehicle acceleration to the designated desired acceleration value. When, however, the desired longitudinal acceleration value designated by the operating element falls below the set threshold value, the system controls the vehicle to a constant desired speed value until a new acceleration operation or a deceleration operation is triggered. Such constant speed control is known from conventional speed control devices in the form of so-called cruise controls, which set the vehicle speed to a value equal to the actual vehicle speed existing at the time when the speed control is activated. In contrast, during this speed control phase the present system uses a desired speed value which is smaller than the actual longitudinal speed value at the time of the activation of the respective speed control phase, by a differential value which is defined as a function of the speed.

This technique has the effect that the level of attention and fast reaction demanded of the driver to adjust the desired speed is not as great as it is in the case of systems which control the speed precisely to value existing when the respective control phase is activated. In practice, this means that, after actuation of the operating element, the vehicle first becomes slower by the defined differential value (which is a function of the existing vehicle speed) before its speed is held constant by the speed control part of the system. Driving tests have demonstrated that, in comparison to other conventional systems, this type of longitudinal speed control results in significantly lower stress to the driver.

In one embodiment of the invention, the sensitivity of the relationship between the desired longitudinal acceleration value on the one hand, and the degree of actuation of the operating element on the other, varies as a function of the vehicle speed (specifically decreasing with rising longitudinal speed). In this manner, the slope of the characteristic curve which defines the functional relationship between the degree of actuation of the operating element and the corresponding indicated desired longitudinal acceleration value advantageously takes into account the fact that the acceleration capacity of motor vehicles decreases with rising speed, because the power required to overcome the road resistance increases considerably with a rising speed. In addition, this selection of a speed-dependent sensitivity for the indication of the desired longitudinal acceleration value takes into account the fact that the absolute acceleration value at high speeds is subjectively felt to be higher than at low speeds, because of kinesthetic, acoustic, visual and mechanical information which the vehicle occupants experience. The speed-dependent selection of the sensitivity of the desired longitudinal acceleration value indication is therefore advantageous, for reasons of automotive engineering as well as for ergonomic reasons.

Other objects, advantages and novel features of the present invention will become apparent from the following detailed description of the invention when considered in conjunction with the accompanying drawings.

DETAILED DESCRIPTION OF THE DRAWINGS

In general, systems for controlling or regulating the longitudinal speed of motor vehicles, particularly of automobiles, are conventional and well known to those skilled in the art. The present invention can be implemented using such a system, in which case only the respective existing control and/or regulating unit must the appropriately designed to implement the methods of operation explained in detail in the following. Such a system is shown schematically in FIG. 3.

Figure 3:
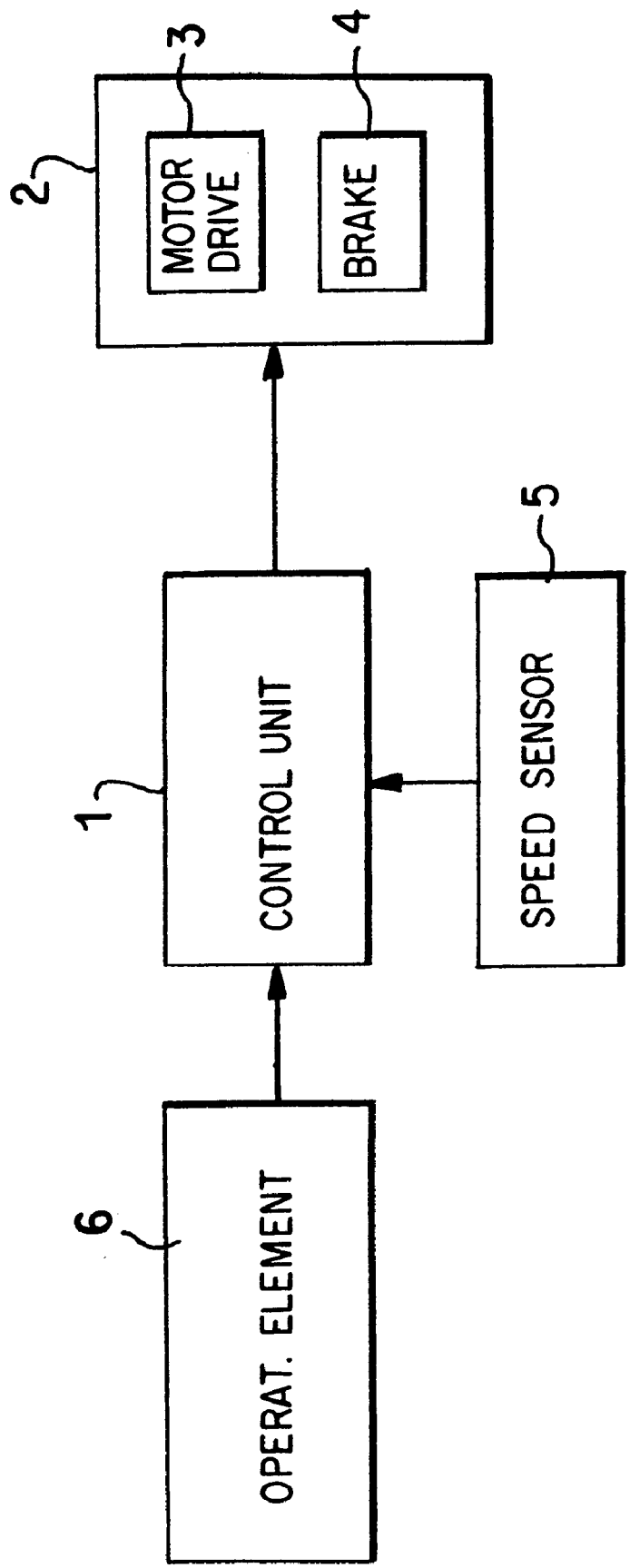
FIG. 3 is a block diagram which illustrates an apparatus for implementing control according to the invention.

Referring to FIG. 3, in addition to the control or regulating unit 1, the system comprises a suitable speed adjusting unit 2 which is controlled by the latter and which comprises a motor drive 3 and a brake system 4, as well as a vehicle speed sensor unit 5 for measuring the actual longitudinal vehicle speed. As the user interface, the system has an operating element 6 which is preferably designed as a control stick which can be operated by one hand. In this case, a logical and clear assignment of functions is selected, in which an acceleration operation is triggered by actuating the operating element toward the front, and a deceleration operation is triggered by an actuation directed to the rear.

Specifically, by such actuation of the operating element in a corresponding direction, the driver indicates desired longitudinal acceleration value $a_s$ as a function of the magnitude of the operating element actuation BG. Such actuation may be given, for example, by the extent of a translational deflection or the deflection angle or, in the case of an isometric operating element design, by an actuating force. By means of corresponding characteristic curves stored in the control and/or regulating unit, the system translates the magnitude of the operating element actuation BG into a desired longitudinal acceleration value $a_s$.

Figure 2:
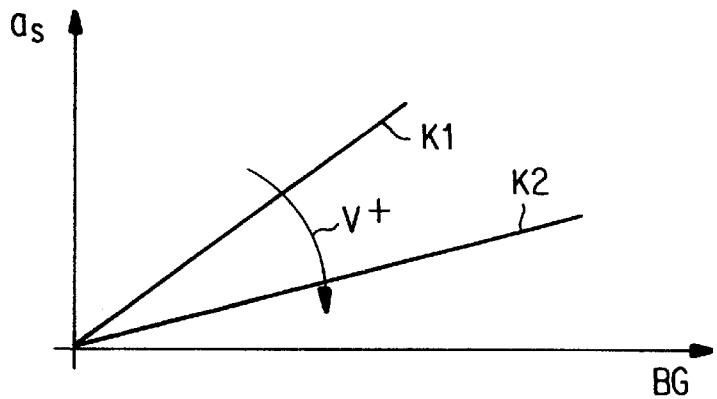
FIG. 2 shows characteristic curves of indicated desired longitudinal acceleration value as a function of the actuation of an operating element of a system according to the invention for controlling longitudinal vehicle speed.

Representative example characteristic curves for this functional relationship are illustrated in FIG. 2. According to the system design illustrated there, a linear course of the characteristic curves is selected; that is, at a given vehicle speed the amount of the desired longitudinal acceleration value $a_s$ rises linearly with the extent of the operating element actuation BG. In addition, the sensitivity of this desired longitudinal acceleration value indication (that is, the rate of rise of the respective characteristic curves) varies as a function of the longitudinal speed of the vehicle, as indicated in FIG. 2 by the arrow $v^+$. Specifically, the sensitivity decreases with increasing longitudinal speed. Thus, as illustrated in FIG. 2, the linear characteristic curve K1, which is applicable for a first longitudinal speed value, changes into a flatter linear characteristic curve K2 when the longitudinal speed rises from the first speed value to a second, higher speed value.

The linear dependence of the desired longitudinal acceleration value $a_s$ (FIG. 2) on the operating element actuating quantity BG, with the sensitivity depending on the speed, achieves a control of the vehicle longitudinal dynamics which is advantageous with respect to automotive engineering and ergonomy. That is, on the one hand, the acceleration capacity of the motor vehicle generally decreases with increasing speed because of the considerable increase in road resistance; and on the other hand, the acceleration awareness which the driver experiences from kinesthetic, acoustic, visual and mechanical information acting upon him is a function of the speed, so that he feels that the absolute acceleration value is higher at high speeds than at low speeds.

Figure 1:
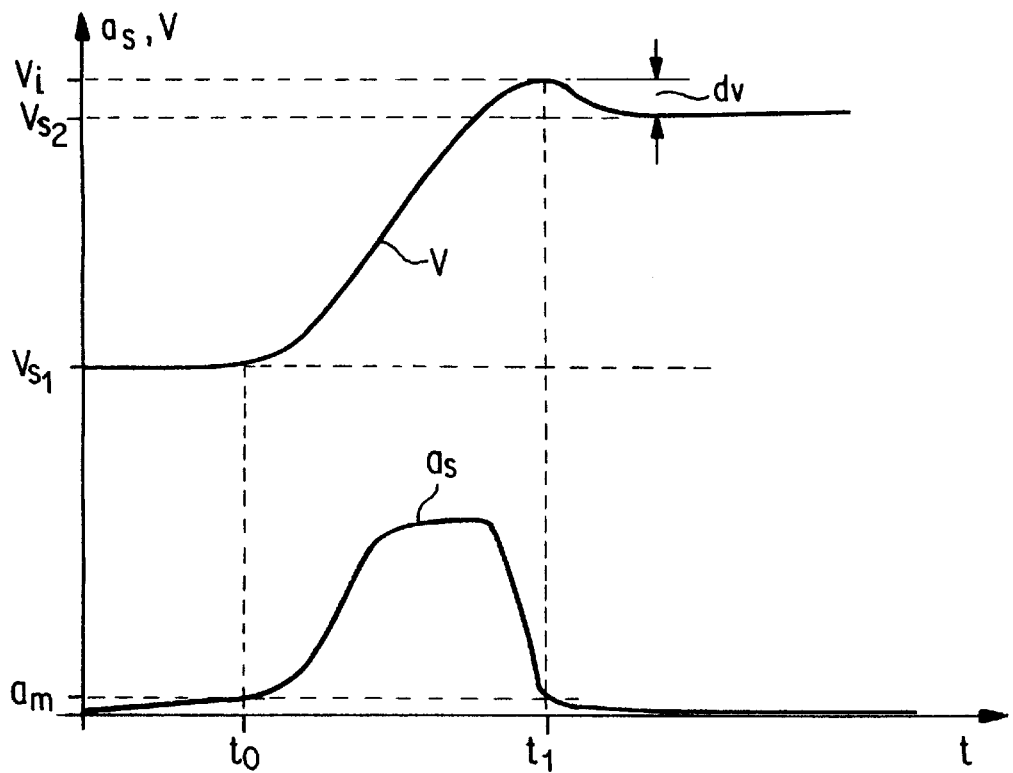
FIG. 1 is a diagram which illustrates a typical speed adjusting phase performed by a system according to the invention for controlling longitudinal vehicle speed.

As a more extensive measure illustrated in FIG. 1, the system contains a longitudinal speed control unit which is activated whenever the desired longitudinal acceleration value as (indicated by means of the operating element) is less than a small threshold value $a_m$, which is only slightly above zero. When activated, the speed control unit controls the vehicle longitudinal speed v to a desired value $v_s$. As a result, if the driver wants to maintain a constant longitudinal speed regardless of road resistance, he does not constantly need to actuate the operating element to compensate for road resistance variations. Suitable speed control units for keeping the longitudinal speed constant are known in the form of cruise controls and need not be further explained here.

If the driver indicates (via the operating element) a desired longitudinal acceleration value which is higher than the threshold value $a_m$, the speed control unit is deactivated, and the acceleration control unit sets the respective positive or negative longitudinal acceleration value by corresponding control of the engine drive (for example, by means of the throttle valve, and/or the brake system). As soon as the driver no longer exercises an actuating force on the operating element (or one which indicates a desired longitudinal acceleration value $a_s$ that is less than the threshold value $a_m$), the speed control unit is activated once again (time $t_1$ in FIG. 1). In this case, it is characteristically provided that the desired speed value $v_s$, to which the longitudinal speed v is subsequently controlled by the speed control part, does not correspond to the actual longitudinal speed value $v_i$ at the instant when the speed control is activated. Rather, the desired value differs by a differential value dv ($v_s=v_i+dv$), which is itself defined as a function of the longitudinal vehicle speed $v_i$ at the instant when the speed control unit is activated. Specifically, dv increases with increasing longitudinal speed $v_i$. This arrangement has the desirable result that, after the driver has released the operating element following an acceleration operation, the vehicle first slows by a certain amount dv, which is a function of the absolute vehicle speed $v_i$, before its longitudinal speed is kept constant by the speed control part of the system.

FIG. 1 illustrates this effect of the system according to the invention, showing qualitatively a typical time progression of the desired longitudinal acceleration value $a_s$ (defined via the operating element) and of the longitudinal vehicle speed v. Initially, to a point in time $t_0$, the operating element is not actuated or is actuated only slightly, so that the defined desired longitudinal acceleration value $a_s$ is below the threshold value $a_m$ and the speed control is therefore active which holds the longitudinal speed at a constant value $v_{s1}$. Subsequently, the driver actuates the operating element to initiate an acceleration, so that from the point in time $t_0$ to a later point in time $t_1$, the desired longitudinal acceleration value $a_s$ defined by the driver (via the operating element and the applicable characteristic curve in FIG. 2) will be above the threshold value $a_m$. As a result, the speed control unit is deactivated during this time period, and the system causes an acceleration of the vehicle corresponding to the desired longitudinal acceleration value $a_s$. Thereafter, at the point in time $t_1$, the defined desired longitudinal acceleration value $a_s$ falls once more below the threshold value $a_m$, so that the speed control unit becomes active again. In this case, however, the system does not control the longitudinal speed to the actual vehicle speed $v_i$ existing at the point in time $t_1$ of the activation. Rather, it controls the vehicle speed to a desired value $v_{s2}$ which is less than the actual momentary vehicle speed $v_i$, by a differential value dv that depends on the momentary speed $v_i$. The speed control unit then holds the longitudinal speed v at this desired speed value $v_{s2}$ without requiring that the driver initiate any further acceleration or deceleration via the operating element.

By means of the control arrangement illustrated in FIG. 1, the system for controlling or regulating the longitudinal vehicle speed according to the invention permits the driver to actuate the operating element (preferably manually) only when he wants to change the speed of the vehicle. The system thus optimally prevents a tiring of the driver's hand actuating the operating element. The indication of a threshold value $a_m$, which is relatively close to zero, for switching between acceleration phases and speed control phases avoids the undesired occurrence of such switching when the driver merely reaches with his hand around the operating element only in a resting manner.

It is understood that the action illustrated in FIG. 1 for a positive acceleration operation, depending on the design of the system, can be implemented analogously; that is with a mirror-inverted course of the characteristic curves, for deceleration operations. According to the application, instead of the adjustment of positive acceleration operations, on the one hand, and deceleration operations, on the other hand, the functionality of the operating element can also be limited to the triggering of positive acceleration operations and a conventional brake pedal can be retained for deceleration operations.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. System for controlling longitudinal speed of a motor vehicle, comprising:
   an operating element for defining a desired longitudinal vehicle acceleration value as a function of a pertaining operating element actuating quantity; and
   a control unit for adjusting longitudinal speed and acceleration in response to actuation of said operating element, wherein
   in first time periods, in which the desired longitudinal acceleration value is above a preset threshold value, said control unit controls the longitudinal vehicle acceleration to the desired longitudinal acceleration value; and
   in second time periods, in which the desired longitudinal acceleration value is below the present threshold value, said control unit controls the longitudinal vehicle speed to a constant desired value; and
   said constant desired value is lower than actual momentary longitudinal vehicle speed at the beginning of the respective second time period, by a differential value which is defined as a function of the speed.

2. System for controlling longitudinal speed of a motor vehicle, comprising:
   an operating element for defining a desired longitudinal acceleration value as a function of a pertaining operating element actuating quantity; and
   a control unit for adjusting vehicle speed and acceleration in response to actuation of said operating element; wherein
   adjusting sensitivity of the desired longitudinal acceleration value to changes of the operating element actuating quantity, varies as a function of vehicle speed, decreasing with an increasing longitudinal speed.

3. The system according to claim 1, wherein:
   adjusting sensitivity of the desired longitudinal acceleration value to changes of the operating element actuating quantity, varies as a function of vehicle speed, decreasing with an increasing longitudinal speed.

4. A method of operating a vehicle speed/acceleration control unit having an operating element for defining a desired longitudinal vehicle acceleration value as a function of an extent of actuation thereof, and a control unit for adjusting longitudinal vehicle speed and acceleration in response to actuation of said operating element, said method comprising:
   in first time periods, in which the desired longitudinal acceleration value is above a preset threshold value, said control unit controls the longitudinal vehicle acceleration to the desired longitudinal acceleration value; and
   in second time periods, in which the desired longitudinal acceleration value is below the present threshold value, said control unit controls the longitudinal vehicle speed to a constant desired value; and
   said constant desired value is lower than actual momentary longitudinal vehicle speed at the beginning of the respective second time period, by a differential value which is defined as a function of the speed.

5. A method of operating a vehicle speed/acceleration control unit having an operating element for defining a desired longitudinal vehicle acceleration value as a function of an extent of actuation thereof, and a control unit for adjusting longitudinal vehicle speed and acceleration in response to actuation of said operating element, said method comprising:
   varying adjusting sensitivity of the desired longitudinal acceleration value to changes of the operating element actuating quantity, as a function of vehicle speed, decreasing with an increasing longitudinal speed.

* * * * *